(12) United States Patent
Kawai

(10) Patent No.: US 8,679,660 B2
(45) Date of Patent: Mar. 25, 2014

(54) ELECTRIC POWER STORAGE APPARATUS

(75) Inventor: Toshiyuki Kawai, Toyohashi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 319 days.

(21) Appl. No.: 12/442,896

(22) PCT Filed: Apr. 25, 2008

(86) PCT No.: PCT/JP2008/058027
§ 371 (c)(1),
(2), (4) Date: Mar. 25, 2009

(87) PCT Pub. No.: WO2008/136384
PCT Pub. Date: Nov. 13, 2008

(65) Prior Publication Data
US 2010/0003581 A1    Jan. 7, 2010

(30) Foreign Application Priority Data

Apr. 26, 2007 (JP) ................................. 2007-116363

(51) Int. Cl.
*H01M 2/12* (2006.01)
*H01M 10/50* (2006.01)

(52) U.S. Cl.
USPC ........................................... 429/53; 429/120

(58) Field of Classification Search
USPC ......................................................... 429/53
IPC ........................... H01M 2/12,2/10, 10/50, 6/50
See application file for complete search history.

(56) References Cited

U.S. PATENT DOCUMENTS

| | | | | |
|---|---|---|---|---|
| 3,589,940 | A | * | 6/1971 | Bridge et al. ...................... 429/6 |
| 6,068,945 | A | * | 5/2000 | Moll ................................ 429/89 |
| 2004/0207368 | A1 | * | 10/2004 | Kimoto et al. ................. 320/150 |
| 2005/0069759 | A1 | * | 3/2005 | Shimamura et al. ............ 429/53 |
| 2005/0130033 | A1 | * | 6/2005 | Iwamura et al. .............. 429/159 |

FOREIGN PATENT DOCUMENTS

| | | |
|---|---|---|
| JP | H05-65054 U | 8/1993 |
| JP | 10-255750 A | 9/1998 |
| JP | 2001-60466 A | 3/2001 |
| JP | 2001-148250 A | 5/2001 |
| JP | 2001-185111 A | 7/2001 |
| JP | 2003-249202 A | 9/2003 |
| JP | 2003-272588 A | 9/2003 |
| JP | 2003-346924 A | 12/2003 |
| JP | 2004-319232 A | 11/2004 |
| JP | 2005-129487 A | 5/2005 |
| JP | 2006-331956 A | 12/2006 |
| JP | 2006331956 A * | 12/2006 |
| JP | 2007-18754 A | 1/2007 |
| JP | 2008-16346 A | 1/2008 |
| WO | 2008120056 A1 | 10/2008 |

* cited by examiner

*Primary Examiner* — Ula C Ruddock
*Assistant Examiner* — Daniel Gatewood
(74) *Attorney, Agent, or Firm* — Kenyon & Kenyon LLP

(57) ABSTRACT

An electric power storage apparatus including a housing, a partition which is placed in the housing to form a first housing portion and a second housing portion, a electric power storage unit which is housed in the first housing portion, a coolant which is housed in the first housing portion and is provided for cooling the electric power storage unit, and a pressure release means for releasing an internal pressure of the first housing portion to the second housing portion in an abnormal state of the electric power storage unit in which gas is produced in the electric power storage unit.

9 Claims, 7 Drawing Sheets

ELECTRIC POWER STORAGE APPARATUS

This is a 371 national phase application of PCT/JP2008/058027 filed 25 Apr. 2008, claiming priority to Japanese Patent Application No. 2007-116363 filed 26 Apr. 2007, the contents of which are incorporated herein by reference.

TECHNICAL FIELD

The present invention relates to a electric power storage apparatus including a electric power storage unit and a coolant for cooling the electric power storage unit.

BACKGROUND ART

Development work of electrically powered vehicles such as electric cars and hybrid cars has been pursued vigorously in recent years. There is an increasing need for secondary batteries with excellent performance, reliability, and safety as driving or auxiliary power sources used in the electrically powered vehicles.

The driving or auxiliary power sources of the electrically powered vehicles require high power density. As one example, a electric power storage apparatus is used which has a container for accommodating an assembled battery including a plurality of unit cells connected in series and/or in parallel and a coolant for cooling the assembled battery.

The container is formed of a container body having side walls and a bottom wall which are integrally formed and an upper case for sealing the container body. The upper case is fixed to the container body via a fastening member.

Each of the unit cells has a gas release valve for letting out gas produced from electrolysis of an electrolyte due to overcharge. The gas release valve allows the release of the gas to prevent an extreme increase in internal pressure of each unit cell.

Patent Document 1 has disclosed a battery housing case which includes a casing having a generally flat shape for housing a laminate sheathed battery in a sealed state, a concave portion having a recessed shape in section bowed inward in the surface of the casing, and a rupture valve placed in a bottom wall surface having the concave portion formed therein, the rupture valve serving as a gas release mechanism for releasing gas ejected from the laminate sheathed battery in the casing to the outside of the casing at the time of an abnormality.

Patent Document 2 has disclosed a cylindrical battery in which small gas-release holes are formed in a unit cell housed in an exterior case and in a cylindrical portion of the exterior case that abuts on the unit cell. High-pressure gas ejected from the unit cell is released from the exterior case through the gas-release holes.

Patent Document 3 has disclosed a battery module in which a plurality of fillers made of materials having different properties are provided between a set of unit cells and a battery case, a low-temperature filler of the fillers that has the lowest flow start temperature is placed near a battery sheath, and upon generation of gas, the low-temperature filler is caused to flow to form space for expansion to ensure release of the gas from near the battery sheath into outside space.

[Patent Document 1] Japanese Patent Laid-Open No. 2005-129487
[Patent Document 2] Laid-open Japanese Utility Model Registration Application No. 05 (1993)-65054
[Patent Document 3] Japanese Patent Laid-Open No. 2003-272588

DISCLOSURE OF THE INVENTION

Problems to be Solved by the Invention

Since gas released from the unit cell to the battery housing case increases the internal pressure of the battery housing case, the battery housing case needs to have higher resistance to pressure. Conceivable approaches to enhancing the resistance to pressure of the battery housing case include increasing the thickness of the battery housing case or the size of the fastening member. These approaches, however, may increase the cost of the battery apparatus and the size thereof.

It is contemplated that the methods disclosed in Patent Documents 1 to 3 are applied to provide the battery housing case with a gas release valve for releasing gas contained in the battery housing case. This approach, however, may cause a leak of insulating oil serving as a coolant, together with the gas, into the interior of the vehicle through the gas release valve.

It is thus an object of the present invention to provide a electric power storage apparatus capable of preventing an increase in internal pressure due to gas produced in a electric power storage unit in an abnormal state thereof without leaking a coolant to the outside.

Means for Solving Problems

To solve the abovementioned problems, the present invention provides a electric power storage apparatus including a housing, a partition which is placed in the housing to form a first housing portion and a second housing portion, a electric power storage unit which is housed in the first housing portion, a coolant which is housed in the first housing portion and is provided for cooling the electric power storage unit, and a pressure release means for releasing an internal pressure of the first housing portion to the second housing portion in an abnormal state of the electric power storage unit (a gas release state) in which gas is produced in the electric power storage unit.

The pressure release means may be a pressure release valve formed in the partition. The pressure release means may be provided at a position above the electric power storage unit.

The second housing portion may include a gas release hole portion for releasing the gas flowing from the first housing portion.

The pressure release valve and the gas release hole portion may be placed on different axes.

The pressure release means includes a holding portion for holding the partition. The partition is detached at the holding portion due to an increased internal pressure of the first housing portion in the abnormal state of the electric power storage unit.

The second housing portion may include a gas release hole portion for releasing the gas flowing from the first housing portion.

A strike plate which is placed between the gas release hole portion and the partition may be provided such that the coolant flows from the first housing portion into the second housing portion and strikes the strike plate in the abnormal state of the electric power storage unit.

The second housing portion may contain an electronic part which is electrically connected to the electric power storage unit. An example of the electronic part may be a switching portion which switches supply of power to a driving member which is driven by the supply of the power from the electric power storage apparatus.

The electric power storage unit has a gas release valve formed therein for releasing the gas. The internal pressure value of the first housing portion when the pressure release means release the pressure is equal to the internal pressure value of the electric power storage unit when the gas release valve releases the gas.

The electric power storage unit may be a set of electric power storage elements including a plurality of electric power storage elements connected in series or in parallel.

The housing may be formed of a housing body which is opened on an upper side thereof and an upper case which covers the opening to seal the housing body. The plurality of electric power storage elements may be supported between a pair of support members and the pair of support members may be fixed to the upper case.

The abovementioned electric power storage unit may be mounted on a vehicle.

Effects of the Invention

According to the present invention, it is possible to prevent an increase in the internal pressure of the electric power storage apparatus without leaking the coolant to the outside in the abnormal state of the electric power storage unit in which the gas is produced in the electric power storage unit.

Figure 1:
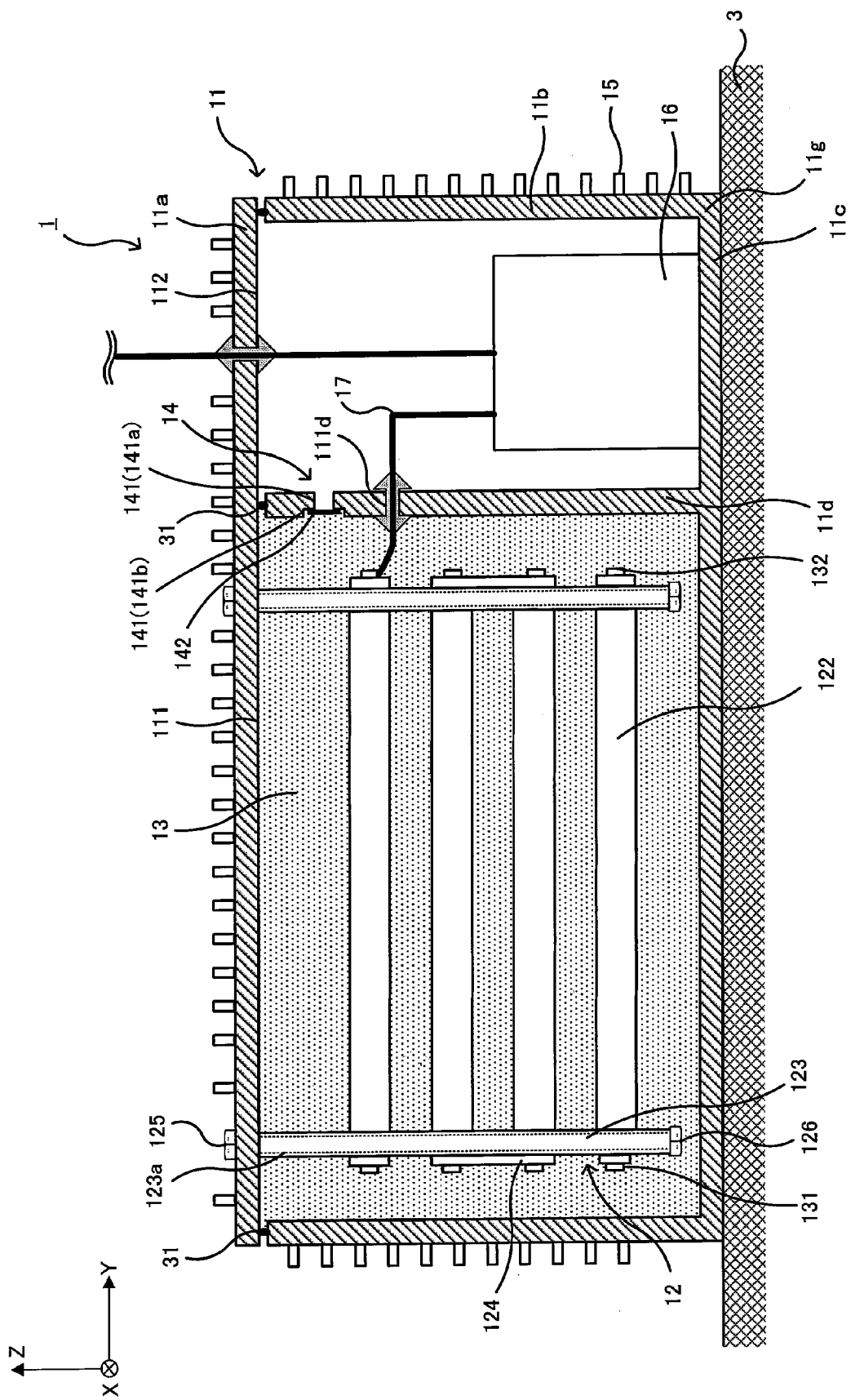
FIG. 1 A section view showing a electric power storage apparatus (before a battery abnormality occurs).

DESCRIPTION OF REFERENCE NUMERALS 1, 101, 201 POWER STORAGE APPARATUS
11 ELECTRIC-DEVICE HOUSING CASE
11a UPPER LID
11b SIDE WALL PORTION
11c BOTTOM WALL PORTION
11d, 51 PARTITION
11e ENGAGEMENT PORTION
11f STRIKE PLATE
11g CONTAINER BODY
51a HOLDING PORTION
111 BATTERY HOUSING PORTION
112 PRESSURE RELEASE CHAMBER
12 ASSEMBLED BATTERY
13 COOLANT
14 PRESSURE RELEASE VALVE
15 HEAT-RADIATING FIN
16 J/B UNIT
17 HARNESS
41 GAS RELEASE PORT
141 THROUGH-HOLE
142 CLOSE PLATE

BEST MODE FOR CARRYING OUT THE INVENTION

Preferred embodiments of the present invention will hereinafter be described with reference to the drawings.

Embodiment 1

Figure 2:
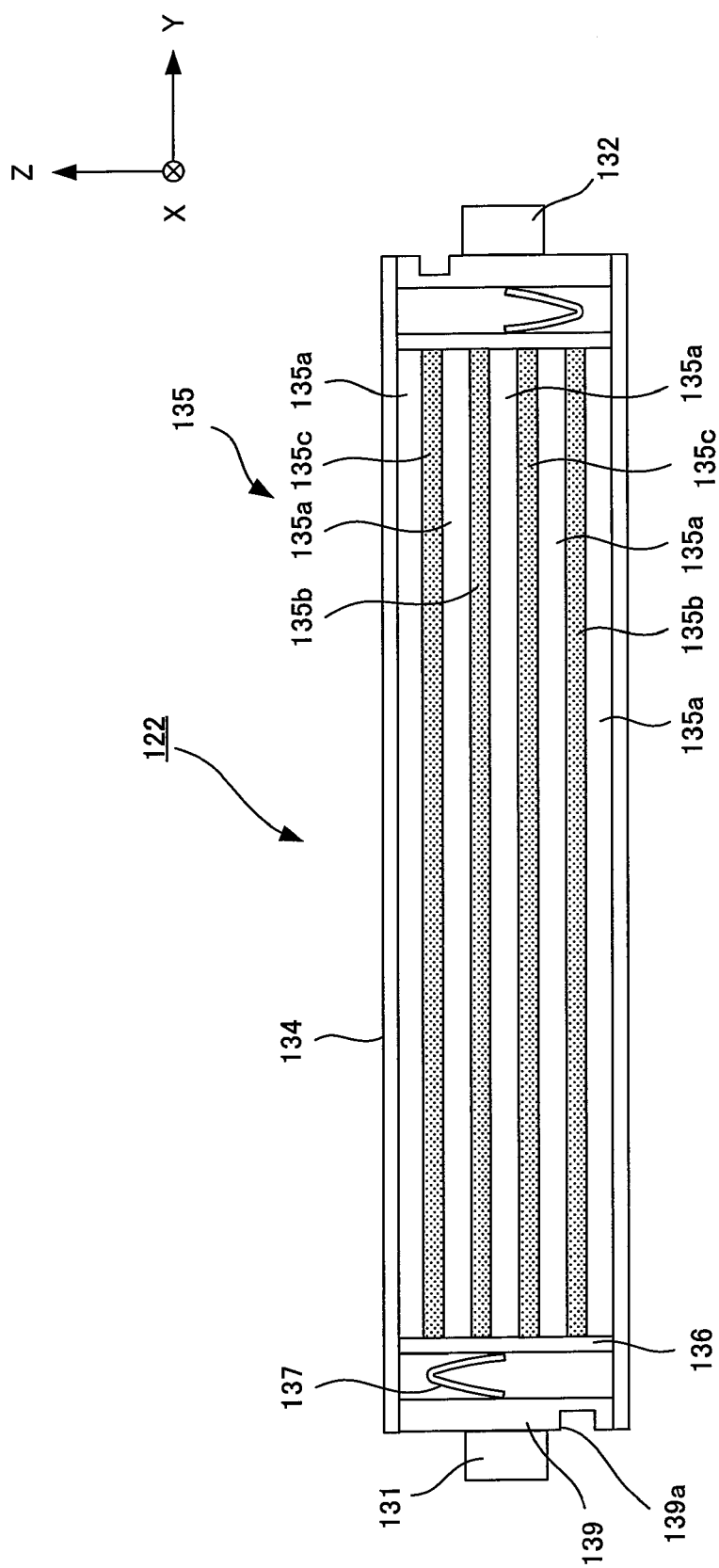
FIG. 2 A section view showing a cylindrical unit cell.
Figure 3:
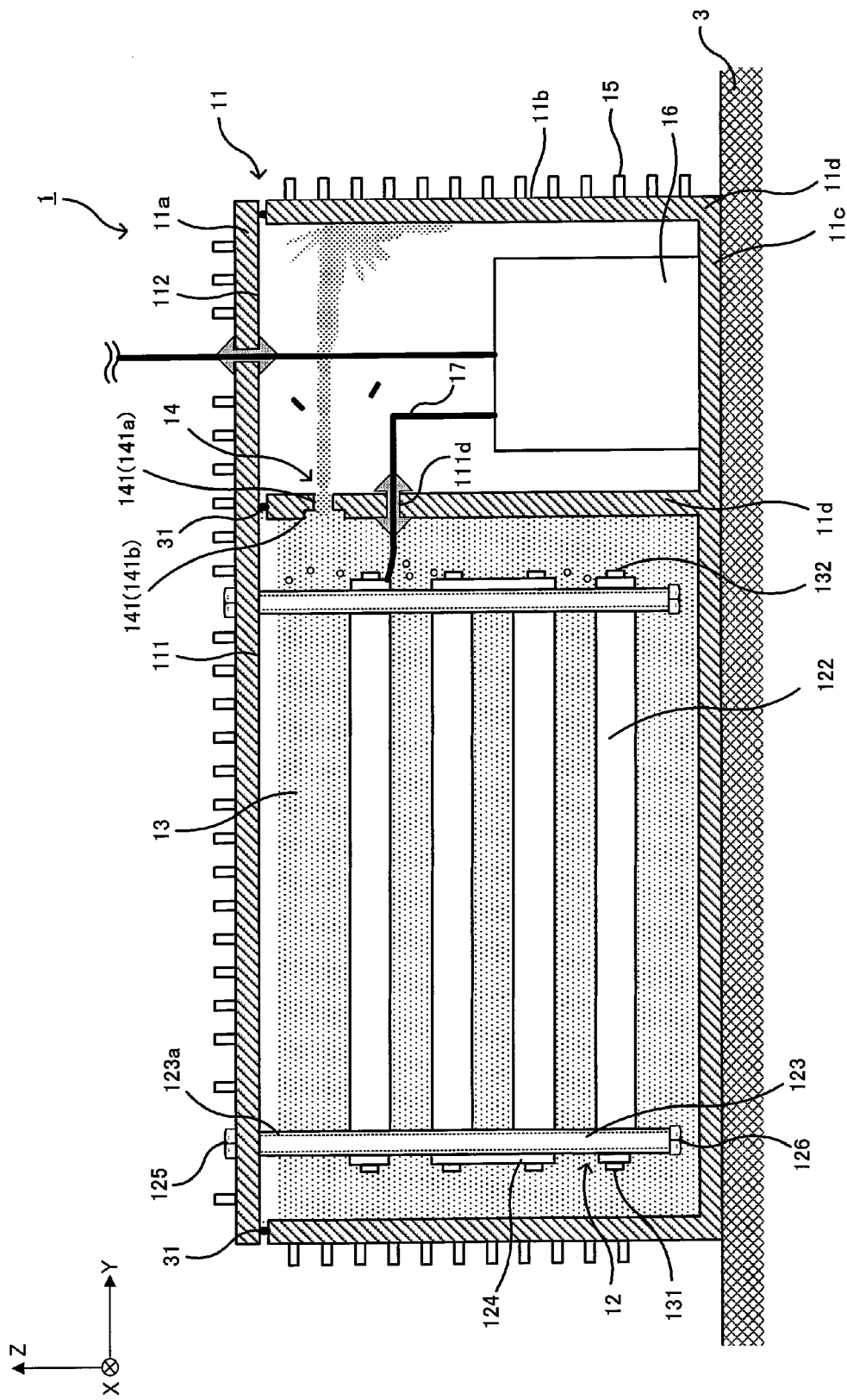
FIG. 3 A section view showing the electric power storage apparatus (when a battery abnormality occurs).

FIG. 1 is a section view showing a electric power storage apparatus before a battery abnormality occurs. FIG. 2 is a section view showing a cylindrical unit cell. FIG. 3 is a section view showing the electric power storage apparatus when a battery abnormality occurs.

A electric power storage apparatus 1 which is Embodiment 1 of the present invention is used as a driving or auxiliary power supply in an electric car or a hybrid car. A partition 11d is placed in an electric-device housing case (housing) 11 to form a battery housing portion (first housing portion) 111 for housing an assembled battery (electric power storage unit, set of electric power storage elements) 12 and a pressure release chamber (second housing portion) 112 for housing a J/B unit 16.

The battery housing portion 111 is filled with a coolant 13 for cooling the assembled battery 12. The partition 11d is provided with a rupture-type valve (pressure release means, pressure release valve) 14 for releasing an internal pressure of the battery housing portion 111 to the pressure release chamber 112 in a battery abnormality state (abnormality state of the electric power storage unit).

A battery abnormality referred to in the specification means a phenomenon in which an electrolyte contained in a cylindrical unit cell 122 is electrolyzed due to overcharge to produce gas in the cylindrical unit cell 122.

The abovementioned structure can prevent the coolant 13 from flowing out of the electric-device housing case 11 and prevent an increase in internal pressure of the battery housing portion 111 in the battery abnormality state. As a result, the thickness of the electric-device housing case 11 can be set to a small value to reduce the electric power storage apparatus 1 in size and weight.

Next, the configuration of each component of the electric power storage apparatus 1 will be described in detail.

The electric-device housing case 11 consists of an upper case 11a and a container body 11g. The container body 11g is formed of a side wall portion 11b and a bottom wall portion 11c which are integrally formed. The upper case 11a is formed separately from the container body 11g. The electric-device housing case 11 is made of metal material such as stainless steal having a high thermal conductivity, for example.

A number of heat-radiating fins 15 are provided on the outer surfaces of the upper case 11a and the side wall portion 11b of the electric-device housing case 11. The heat-radiating fins 15 increase the area in contact with outside air to allow efficient heat radiation for the assembled battery 12.

An oil seal 31 is interposed between the upper case 11a and the side wall portion 11b to seal the coolant 13 in the battery housing portion 111. An oil seal 31 is interposed between the upper case 11a and the partition 11d to seal the coolant 13 in the battery housing portion 111. The upper case 11a is fixed to the side wall portion 11b via a fastening member, not shown.

The electric power storage apparatus 1 is mounted on a floor panel 3 under a seat. A flange portion, not shown, is formed on the side surface of the electric-device housing case 11. The flange portion is fixed to the floor panel 3 to secure the electric power storage apparatus 1.

The partition 11d is formed integrally with the bottom wall portion 11c of the electric-device housing case 11. The rupture-type valve 14 is formed at a position in an area above the assembled battery 12 in a vertical direction (Z-axis direction).

The rupture-type valve 14 is formed of a through-hole portion 141 which extends through the partition 11d to connect the battery housing portion 111 to the pressure release chamber 112 and a close plate 142 which closes the through-hole portion 141 to prevent the coolant 13 from flowing into the pressure release chamber 112. Alternatively, the partition 11d and the bottom wall portion 11c may be formed separately and then joined together by a bonding means such as welding.

The through-hole portion 141 is formed of a smaller through-hole portion 141a closer to the pressure release chamber 112 and a larger through-hole portion 141b closer to the battery housing portion 111 and having a diameter larger than that of the smaller through-hole portion 141a. The close plate 142 is fixed to an end face of the larger through-hole portion 141b closer to the pressure release chamber 112 (end face in a Y-axis direction). The fixing of the close plate 142 can be performed by a known method such as welding and sticking with an adhesive.

The close plate 142 has a mechanical strength set such that the close plate 142 is broken at a pressure value lower than the upper limit of resistance to pressure of the battery housing portion 111. In Embodiment 1, the close plate 142 is broken when the internal pressure value of the battery housing portion 111 reaches 1 Mpa.

A harness inserting hole portion 111d is formed in the partition 11d near the lower end portion thereof to pass a harness 17 which electrically connects the assembled battery 12 to the J/B unit 16. A seal ring, not shown, is interposed between the harness inserting hole portion 111d and the harness 17 to seal the coolant 13 in the battery housing portion 111. The J/B unit 16 is provided for switching supply of power to a driving motor, not shown, for driving the vehicle.

When the battery abnormality occurs, the coolant 13 flows from the battery housing portion 111 into the pressure release chamber 112 and comes into contact with the J/B unit 16. However, the J/B unit 16 is unusable as well as the assembled battery 12 in the battery abnormality state, which eliminates the need for waterproofing or the like of the J/B unit 16.

In this manner, the electric device which becomes unusable as well as the assembled battery 12 in the battery abnormality state is housed in the pressure release chamber 112 to allow effective use of space in the pressure release chamber 112. This can reduce the size of the electric power storage apparatus 1.

The electric device herein mentioned includes not only the J/B unit 16 but also another electric device (for example, a battery ECU which monitors an amount of charge and discharge of the assembled battery 12) connected electrically to the assembled battery 12.

The assembled battery 12 is a set of unit cells including a plurality of cylindrical unit cells 122 arranged in parallel. Each of the cylindrical unit cells 122 is supported between a pair of support plates 123. Electrodes 131 and 132 of each of the cylindrical unit cells 122 protrude from the paired support plates 123 and are electrically connected through a bus bar 124.

The support plate 123 for the assembled battery 12 has a screw hole portion 123a formed therein in a penetrating shape extending in the vertical direction. A fastening bolt 125 is inserted into each of the screw hole portions 123a through the upper case 11a from the outside of the electric-device housing case 11. The end portion of the fastening bolt 125 protrudes from the lower surface of the support plate 123, and a fastening nut 126 is tightened at the end portion of the fastening bolt 125. Thus, the assembled battery 12 and the upper case 11a can be unitized into one.

The unitized assembled battery 12 and upper case 11a enables simultaneous conduction of the work of assembling the upper case 11a onto the container body 11d and the work of housing the assembled battery 12 in the battery housing portion 111. This can achieve the works efficiently.

When the assembled battery 12 is used for the driving or auxiliary power supply of a vehicle, charge and discharge generate heat at a high temperature and thus gas cooling only by cooling wind is not sufficient. To address this, in the present invention, the coolant 13 with a higher heat conductivity than cooling gas is used as a cooling medium for the assembled battery 12.

Suitable materials of the coolant 13 filled in the battery housing portion 111 include one that has a high specific heat, a high thermal conductivity, and a high boiling point, causes no corrosion of the electric-device housing case 11 or the assembled battery 12, and has resistance to thermal decomposition, air oxidation, electrolysis or the like.

An electrical insulating liquid is desirable to prevent a short-circuit between electrode terminals. For example, a fluorinated inert liquid can be used. Examples of the fluorine-containing inert liquid may include Fluorinert manufactured by 3M, Novec HFE (hydrofluoroether), and Novec1230. A liquid other than the fluorine-containing inert liquid may be used (for example, silicone oil).

Next, the structure of each of the cylindrical electric cells 122 will be described in more detail with reference to FIG. 2. Electrode element 135 is housed inside a battery outer case 134 of a tubular shape.

The electrode element 135 is formed by spirally winding a strip-shaped positive electrode element 135b having a positive electrode active material applied to both surface thereof and a strip-shaped negative electrode element 135c having a negative electrode active material applied to both surface thereof with a separator 135a interposed between them.

The battery outer case 134 contains an electrolyte injected therein. The electrolyte may be impregnated into the separator 135a.

Examples of the positive electrode active material may include $LiCoO_2$, $LiNiO_2$, $LiFeO_2$, $LiCuo_2$, $LiMnO_2$, $LiMo_2$ (M represents at least two of transition elements selected from the group consisting of Co, Ni, Fe, Cu, and Mn), and $LiMn_2O_4$, all of which are lithium-transition element compound oxides. The negative electrode active material is not particularly limited as long as it may electrochemically occlude and emit lithium ions. Specific examples thereof may include natural graphite, artificial graphite, coke, organic burned body, and metal chalcogenides.

Examples of lithium salt used as a solute of the electrolyte may include $LiClO_4$, $LiCF_3SO_3$, $LiPF_6$, $LiN(CF_3SO_2)_2$, $LiN(C_2F_5SO_2)_2$, $LiBF_4$, $LiSbF_6$, and $LiAsF_6$. Examples of an organic solvent used for dissolving the lithium salt may include a mixture of a cyclic carbonate and a chain carbonate. Example of the cyclic carbonate may include ethylene carbonate, propylene carbonate, vinylene carbonate, and butylene carbonate. Example of the chain carbonate may include dimethyl carbonate, diethyl carbonate, and methyl ethyl carbonate.

A disc-shaped current collecting plate 136 is welded to each end of the electrode element 135 in a longitudinal direction (Y direction) of the battery. The current collecting plate 136 may be made of aluminum foil, stainless steel fail, or copper foil, for example. The current collecting plates 136 are electrically and mechanically connected through conducting wires 137 to holding plates 139 which hold the electrodes 131 and 132.

A rupture-type valve (gas release valve) 139a is formed in part of each of the holding plates 139 and has a smaller dimension than in other portions in a thickness direction. The rupture-type valves 139a can be formed by punching or the like.

When gas is produced in the electrode element 135 and causes the internal pressure of the battery outer can 134 to reach the upper limit of pressure (for example, 1 MPa), the rupture-type valve 139a is broken and lets out the gas to the outside of the cylindrical unit cell 122.

Next, the behavior of the electric power storage apparatus 1 will be described when the assembled battery 12 is overcharged with reference to FIGS. 1 and 3. In overcharge of the assembled battery 12, the electrolyte contained in the cylindrical unit cell 122 is electrolyzed to produce gas which increases the internal pressure of the battery outer can 134. As the internal pressure of the battery outer can 134 is further increased and reaches 1 Mpa, the rupture-type valve 139a is broken. The breakage of the rupture-type valve 139a causes the gas to be released into the coolant 13 to increase the internal pressure of the battery housing portion 111.

After the gas is released into the coolant 13, the internal pressure of the battery housing portion 111 immediately reaches 1 Mpa to break the close plate 142 as shown in FIG. 3. The coolant 13 contained in the battery housing portion 111 is ejected into the pressure release chamber 112 through the through-hole portion 141 in a horizontal direction. The coolant 13 ejected into the pressure release chamber 112 strikes the side wall portion 11b of the electric-device housing case 11 and then falls and is stored at the bottom of the pressure release chamber 112.

In this manner, the strengths of the rupture-type valves 139a and of the close plate 142 are set such that the internal pressure value of the cylindrical unit cell 122 when the rupture-type valve 139a is broken is equal to the internal pressure value of the battery housing portion 111 when the close plate 142 is broken. Once the battery abnormality occurs, the pressure in the battery housing portion 111 can be immediately released to the pressure release chamber 112 to prevent an increased internal pressure of the electric-device housing case 11.

When the coolant 13 continues to be ejected until the liquid level of the coolant 13 drops to the position of the through-hole portion 141, the gas in the battery housing portion 111 flows out to the pressure release chamber 112 through the through-hole portion 141.

The coolant 13 and the gas are partially moved to the pressure release chamber 112 in the battery abnormality state to enable prevention of an increased internal pressure of the battery housing portion 111. Consequently, it is possible to reduce the thickness of the electric-device housing case 11 and the size of the fastening member for connecting the upper case 11a and the container body 11d, so that the electric power storage apparatus 1 can be reduced in size and weight.

Since the rupture-type valve 14 is provided at the position above the assembled battery 12, that is, above the cylindrical unit cell 122 located at the highest position in the assembled battery 12, the gas can be rapidly released into the pressure release chamber 112.

Embodiment 2

Figure 4:
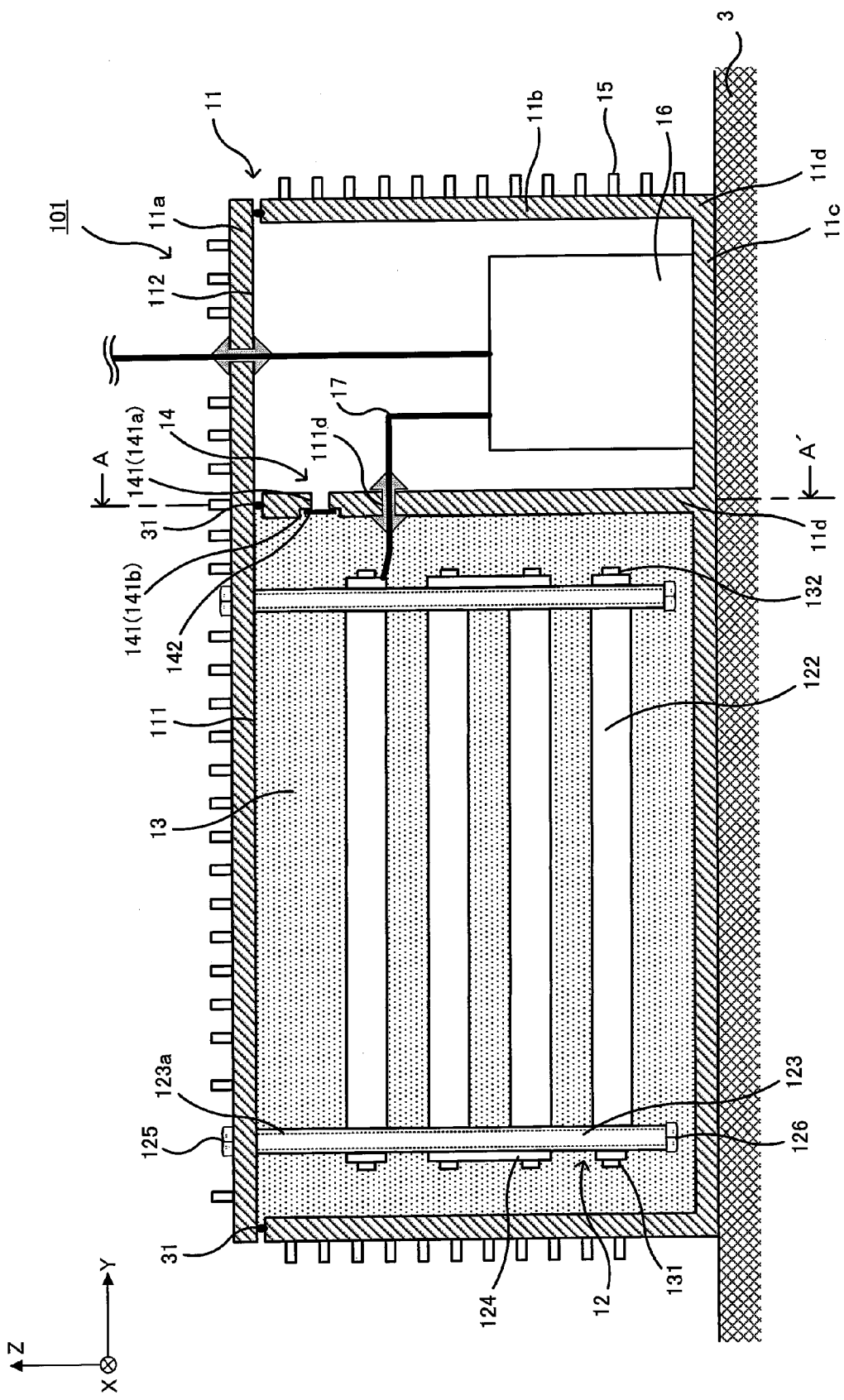
FIG. 4 A section view showing a poser storage apparatus 101 of Embodiment 1.
Figure 5:
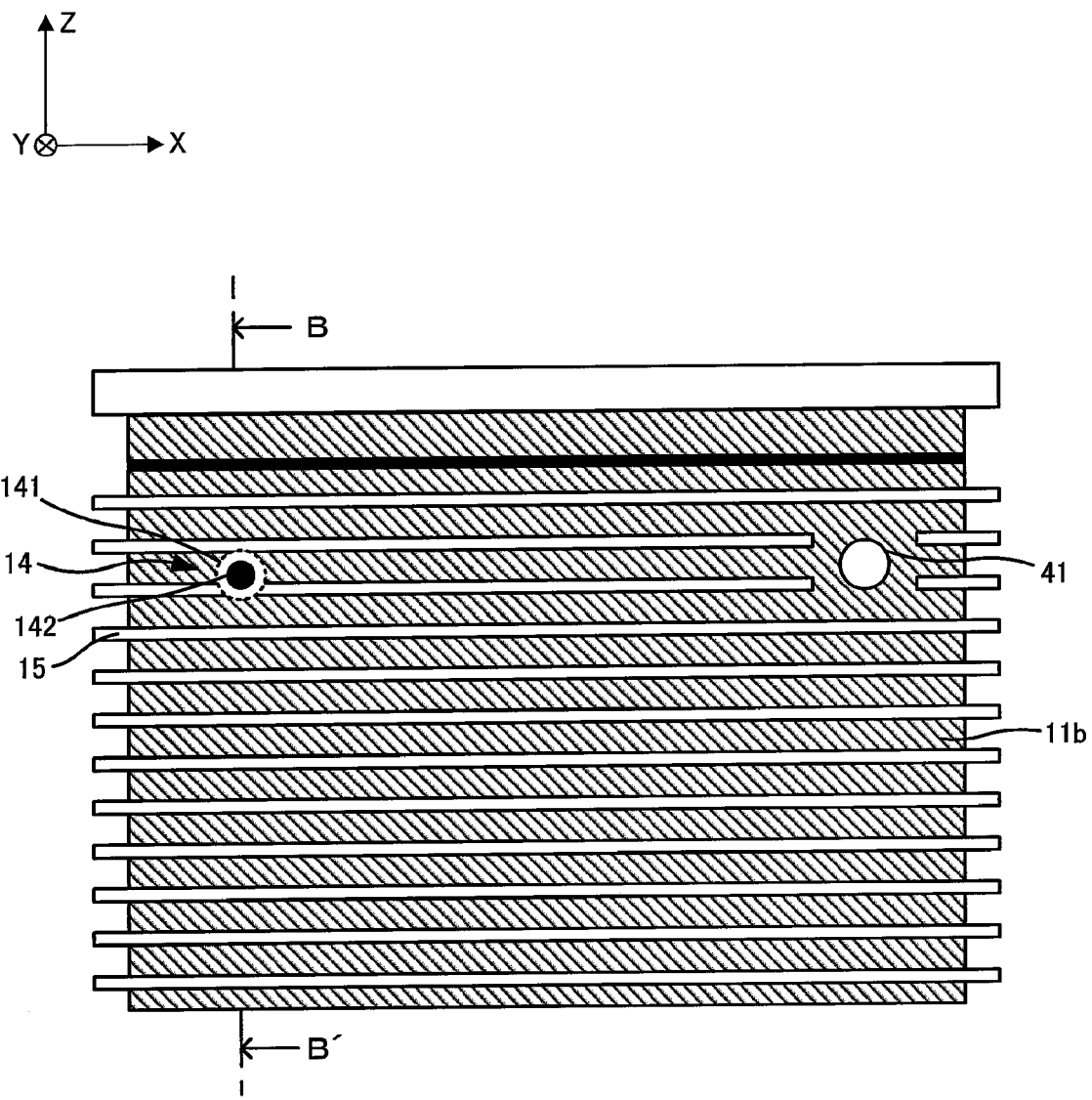
FIG. 5 A section view taken along a A-A' line in FIG. 4.

Next, Embodiment 2 of the present invention will be described with reference to FIGS. 4 and 5. Components identical to those in Embodiment 1 are designated with the same reference numerals, and description thereof is omitted. FIG. 4 is a section view showing a electric power storage apparatus 101 shown in FIG. 5 taken along a B-B' line. FIG. 5 shows a rupture-type valve 14 projected onto a side wall portion 11b.

The side wall portion 11b of a pressure release chamber 112 has a gas release hole portion 41 formed therein to release gas, which has flowed from a battery housing portion 111 into the pressure release chamber 112, to the outside of the electric power storage apparatus 101 in a battery abnormality state. As shown in FIG. 5, a rupture-type valve 14 and the gas release hole portion 41 are placed on different axes which extend in a thickness direction (direction in parallel with a Y-axis direction) of a partition 11d.

It is essential only that the gas release hole portion 41 be formed above the liquid level of a coolant 13 flowing into the pressure release chamber 112. Specifically, the gas release hole portion 41 may be located above the liquid level of the coolant 13 in the pressure release chamber after the portion of the coolant 13 in the battery housing portion above the rupture-type valve 14 flows into the pressure release chamber 112. This can prevent an outflow of the coolant 13 through the gas release hole portion 41.

Next, the behavior of the electric power storage apparatus 101 will be described when an assembled battery 12 is overcharged. In overcharge of the assembled battery 12, an electrolyte contained in a cylindrical unit cell 122 is electrolyzed to produce gas which increases the internal pressure of a battery outer can 134. As the internal pressure of the battery outer can 134 is further increased and reaches 1 Mpa, a rupture-type valve 139a is broken. The gas is released into the coolant 13 through the broken valve 139a to increase the internal pressure of the battery housing portion 111.

After the gas is released into the coolant 13, the internal pressure of the battery housing portion 111 immediately reaches 1 Mpa to break a close plate 142 as shown in FIG. 3. The breakage of the close plate 142 causes the coolant 13 in the battery housing portion 111 to be ejected into the pressure release chamber 112 through a through-hole portion 141 in a horizontal direction. The coolant 13 ejected into the pressure release chamber 112 strikes the side wall portion 11b of an electric-device housing case 11 and then falls and is stored at the bottom of the pressure release chamber 112. Thus, similar effects to those in Embodiment 1 can be achieved.

When the coolant 13 continues to be ejected until the liquid level of the coolant 13 drops to the position of the through-hole portion 141, the gas stored in an upper portion in the battery housing portion 111 flows into the pressure release chamber 112 through the through-hole portion 141. The gas flowing into the pressure release chamber 112 is released through the gas release hole portion 41.

In this manner, according to the configuration of Embodiment 2, the coolant 13 and the gas can be partially moved to the pressure release chamber 112 and the gas flowing into the pressure release chamber 112 can be quickly released through the gas release hole portion 41 in the battery abnormality state. This can prevent an increase in internal pressure of the electric power storage apparatus 101 more immediately than in the configuration of Embodiment 1. In addition, the other effects described in Embodiment 1 can be provided.

Embodiment 3

Figure 6:
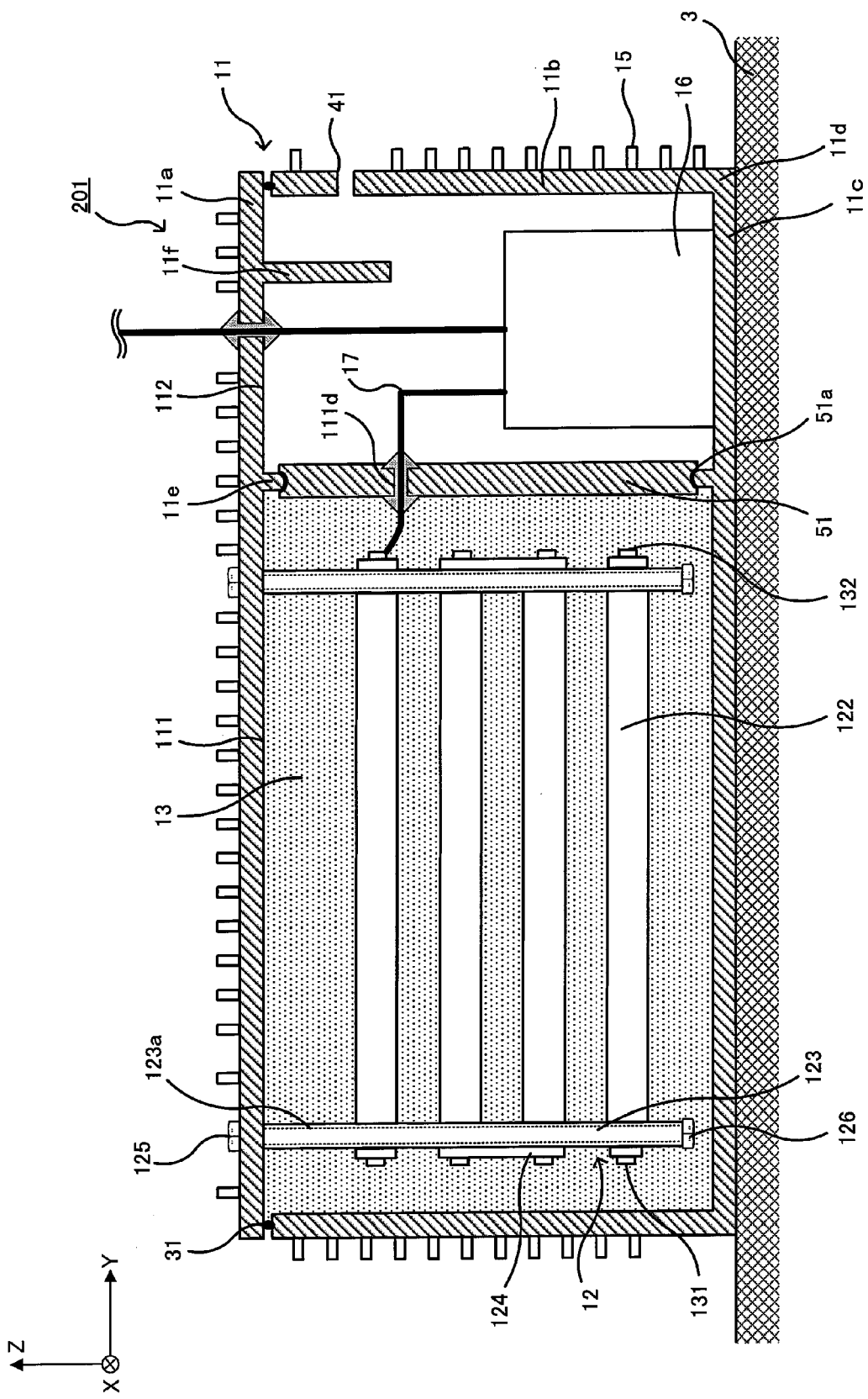
FIG. 6 A section view showing a electric power storage apparatus (before a battery abnormality occurs).
Figure 7:
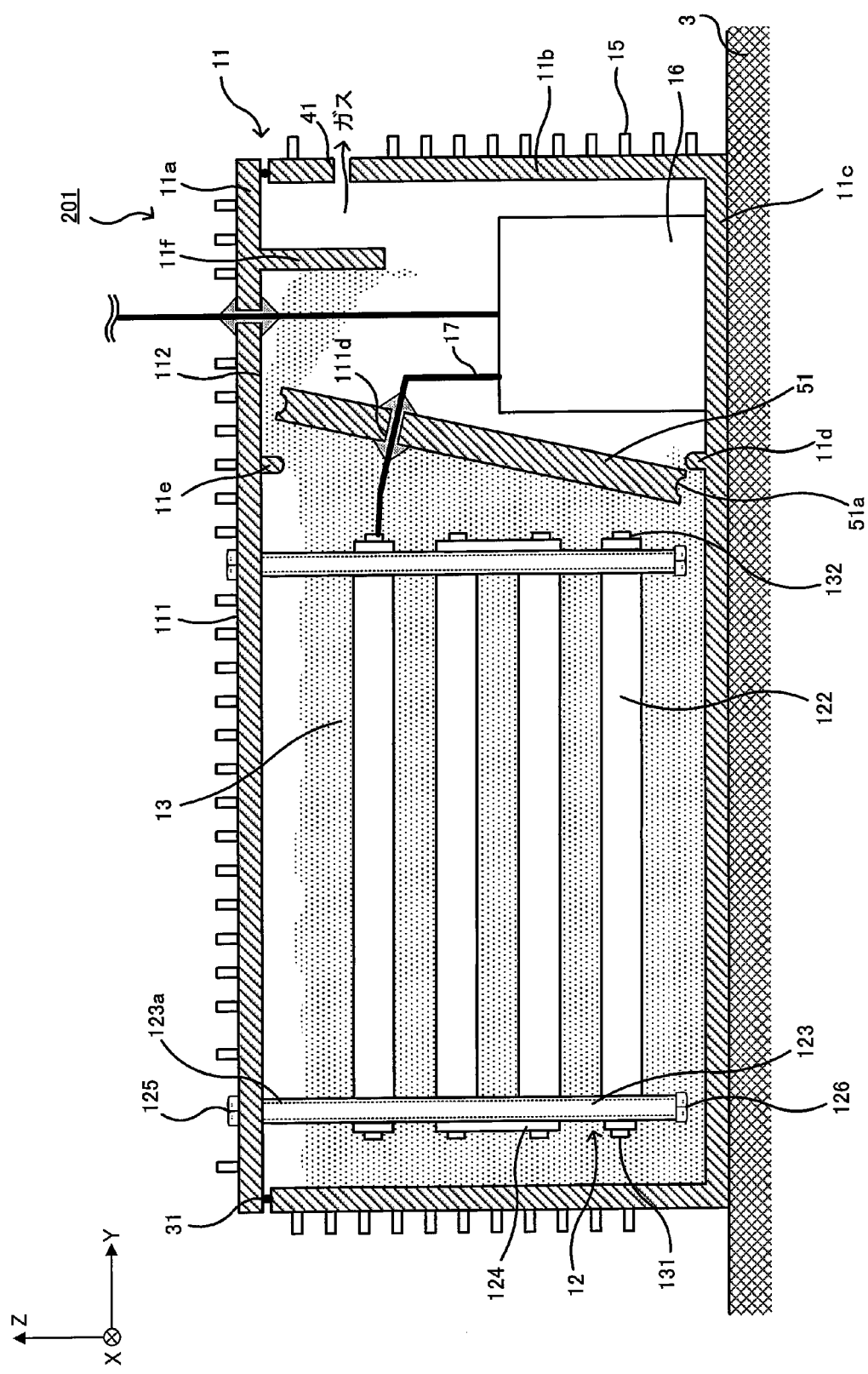
FIG. 7 A section view showing the electric power storage apparatus (when a battery abnormality occurs).

Next, Embodiment 3 of the present invention will be described with reference to FIGS. 6 and 7 which are section views showing a electric power storage apparatus of Embodiment 3. FIG. 6 shows a state before a battery abnormality occurs. FIG. 7 shows a state when a battery abnormality occurs. Components having the same functions as those in Embodiments 1 and 2 are designated with the same reference numerals.

A partition 51 is placed in an electric-device housing case 11. A battery housing portion 111 and a pressure release chamber 112 are formed on the left and right of the partition 51, respectively.

A holding portion 51*a* recessed in a round shape is formed in each of upper and lower end faces of the partition wall 51. An engagement portion (pressure release means) 11*e* protruding in a round shape is formed in each of inner wall portions of an upper case 11*a* and of a bottom wall portion 11*c*. The engagement portions 11*e* can be fitted into the holding portions 51*a* to hold the partition 51 on the holding portions 51*a*. The partition 51 in Embodiment 3 is not provided with any member that corresponds to the pressure release valves in Embodiments 1 and 2.

In a variation, it is possible to form an engagement portion protruding in a round shape in each of upper and lower end faces of the partition 51 and to form a holding portion recessed in a round shape in each of inner wall portions of the upper case 11*a* and the bottom wall portion 11*c*.

A strike plate 11*f* protruding between the partition 51 and the gas release hole portion 41 is formed on the inner wall portion of the upper case 11*a* of the pressure release chamber 112.

Next, the behavior of a electric power storage apparatus 201 will be described when an assembled battery 12 is overcharged. In overcharge of the assembled battery 12, an electrolyte contained in a cylindrical unit cell 122 is electrolyzed to produce gas which increases the internal pressure of a battery outer can 134. As the internal pressure of the battery outer can 134 is further increased and reaches 1 Mpa, a rupture-type valve 139*a* is broken. The gas is released into the coolant 13 through the broken valve 139*a* to increase the internal pressure of the battery housing portion 111.

When the internal pressure of the battery housing portion 111 excesses 1 Mpa, the holding portions 51*a* are disengaged from the engagement portions 11*e* to detach the partition 51 from the holding portions 51*a* as shown in FIG. 7.

The coolant 13 and the gas contained in the battery housing portion 111 flow into the pressure release chamber 112 through the space formed between the engagement portions 11*e* of the electric-device housing case 11 and the partition 51. This can prevent an increase in internal pressure of the battery housing portion 111.

Part of the coolant 13 that flows into the pressure release chamber 112 and is then directed toward the gas release hole portion 41 hits the strike plate 11*f* placed between the gas release hole portion 41 and the partition 51 and then falls and is stored at the bottom of the pressure release chamber 112. This can prevent an outflow of the coolant 13 through the gas release hole portion 41.

The gas which flowed into the pressure release chamber 112 from the battery housing portion 111 is released through the gas release hole portion 41.

In this manner, according to the configuration of Embodiment 3, the coolant 13 and the gas can be partially moved to the pressure release chamber 112 and the gas flowing into the pressure release chamber 112 can be quickly released through the gas release hole portion 41 in the batter abnormality state. This can prevent an increased internal pressure of the battery housing portion 111 more immediately than in the configuration of Embodiment 1. As a result, the electric power storage apparatus 201 can be reduced in size and weight.

Other Embodiments

An electric device connected electrically to the assembled battery 12 may be provided outside the electric-device housing case 11. Specifically, the pressure release chamber 112 may be used only for containing the coolant 13 and the gas flowing from the battery housing portion 111 in the battery abnormality state.

A filter for capturing the coolant 13 may be provided for the gas release hole portion 41. This can prevent an outflow of the coolant 13 reliably. The gas release hole portion 41 may be formed in the upper case 11*a* of the pressure release chamber 112. In addition, the gas release hole portion 41 may be connected to a pipe which lets out the gas in the pressure release chamber 112 to the outside of the vehicle.

The present invention is applicable to a square-type battery (electric power storage apparatus) including stacked electrode elements having an electrolyte between a positive electrode and a negative electrode and to an electric double layer capacitor (electric power storage apparatus).

The invention claimed is:

1. An electric power storage apparatus comprising:
a housing;
a vertical partition which is placed in the housing to separate a first housing portion and a second housing portion positioned horizontally and adjacently side-by-side;
an electric power storage unit which is housed in the first housing portion;
a coolant which is housed in the first housing portion and is provided for cooling the electric power storage unit, wherein the coolant is sealed in the first housing portion;
a pressure release valve which is formed in the vertical partition and releases an internal pressure of the first housing portion to the second housing portion by changing from a closed state to an open state in an abnormal state of the electric power storage unit in which gas is produced in the electric power storage unit;
the second housing portion containing an electronic part that is electrically connected to the electric power storage unit;
the second housing portion is filled with gas when the pressure release valve is in the closed state; and
the pressure release valve allows the coolant to move from the first housing portion to the second housing portion when releasing the internal pressure of the first housing portion, and allowing the coolant to contact the electronic part.

2. The electric power storage apparatus according to claim 1, wherein the pressure release valve is provided at a position which is higher than the electric power storage unit.

3. The electric power storage apparatus according to claim 1, wherein the second housing portion includes a gas release hole portion for releasing the gas flowing from the first housing portion.

4. The electric power storage apparatus according to claim 3, wherein the pressure release valve and the gas release port are placed on different axes.

5. The electric power storage apparatus according to claim 1, wherein the electronic part includes a switching portion which switches supply of power to a driving motor which is driven by the supply of the power from the electric power storage apparatus.

6. The electric power storage apparatus according to claim 1, wherein the electric power storage unit has a gas release valve formed therein for releasing the gas, and
- wherein an internal pressure value of the first housing portion when the pressure release valve releases the pressure is equal to an internal pressure value of the electric power storage unit when the gas release valve releases the gas.

7. The electric power storage apparatus according to claim 1, wherein the electric power storage unit is a set of electric power storage elements including a plurality of electric power storage elements connected in series or in parallel.

8. The electric power storage apparatus according to claim 7, wherein the housing is formed of a housing body which is opened on an upper side thereof and an upper case which covers the opening to seal the housing body, and
- wherein the plurality of electric power storage elements are supported between a pair of support members and the pair of support members is fixed to the upper case.

9. A vehicle on which the electric power storage unit according to claim 1 is mounted.

\* \* \* \* \*

UNITED STATES PATENT AND TRADEMARK OFFICE
CERTIFICATE OF CORRECTION

PATENT NO. : 8,679,660 B2
APPLICATION NO. : 12/442896
DATED : March 25, 2014
INVENTOR(S) : Toshiyuki Kawai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 435 days.

Signed and Sealed this

Twenty-ninth Day of September, 2015

Michelle K. Lee
*Director of the United States Patent and Trademark Office*